(12) United States Patent
Moore, Jr.

(10) Patent No.: US 8,333,402 B2
(45) Date of Patent: Dec. 18, 2012

(54) SYSTEM FOR VEHICLE AND TRAILER CONNECTION

(76) Inventor: Claud T Moore, Jr., Houston, TX (US)

( * ) Notice: Subject to any disclaimer, the term of this patent is extended or adjusted under 35 U.S.C. 154(b) by 328 days.

(21) Appl. No.: 12/732,015

(22) Filed: Mar. 25, 2010

(65) Prior Publication Data

US 2011/0233897 A1    Sep. 29, 2011

(51) Int. Cl.
*B62D 53/00*    (2006.01)
(52) U.S. Cl. .................................... 280/477; 280/416.1
(58) Field of Classification Search ............ 280/477, 280/416.1, 416.3
See application file for complete search history.

(56) References Cited

U.S. PATENT DOCUMENTS

| | | | |
|---|---|---|---|
| 2,804,315 A | 8/1957 | Guye | |
| 3,588,145 A * | 6/1971 | Thompson | 280/156 |
| 3,605,457 A | 9/1971 | Foster | |
| 3,801,133 A | 4/1974 | Thompson | |
| 3,891,237 A * | 6/1975 | Allen | 280/477 |
| 4,178,011 A * | 12/1979 | Kirsch | 280/477 |
| 4,254,968 A | 3/1981 | DelVecchio | |
| 4,346,911 A * | 8/1982 | Wiese | 280/478.1 |
| 4,560,184 A * | 12/1985 | Williams, Jr. | 280/477 |
| 4,657,275 A | 4/1987 | Carroll | |
| 4,781,394 A | 11/1988 | Schwarz et al. | |
| 4,792,151 A * | 12/1988 | Feld | 280/406.2 |
| 4,811,965 A * | 3/1989 | Eubanks | 280/455.1 |
| 4,844,497 A * | 7/1989 | Allen | 280/477 |
| 5,161,815 A | 11/1992 | Penor, Jr. | |
| 5,465,992 A | 11/1995 | Anderson | |
| 5,788,257 A * | 8/1998 | Meyerhofer | 280/416.1 |
| 6,382,653 B1 | 5/2002 | Bass | |
| 8,047,559 B2 * | 11/2011 | Harlin | 280/477 |
| 2010/0117332 A1 * | 5/2010 | Harlin | 280/477 |

* cited by examiner

*Primary Examiner* — Kevin Hurley
(74) *Attorney, Agent, or Firm* — John K. Buche; Buche & Associates, P.C.

(57) ABSTRACT

The present application is directed to a system and related methods for connecting a vehicle with a trailer. The system includes, but is not limited to, embodiments featuring (a) a docking assembly for securing to the vehicle, the docking assembly being pivotable; and (b) a coupler assembly comprising a first part operationally configured to secure to a trailer, and a second part operationally configured for releasable securement to the docking assembly.

29 Claims, 10 Drawing Sheets

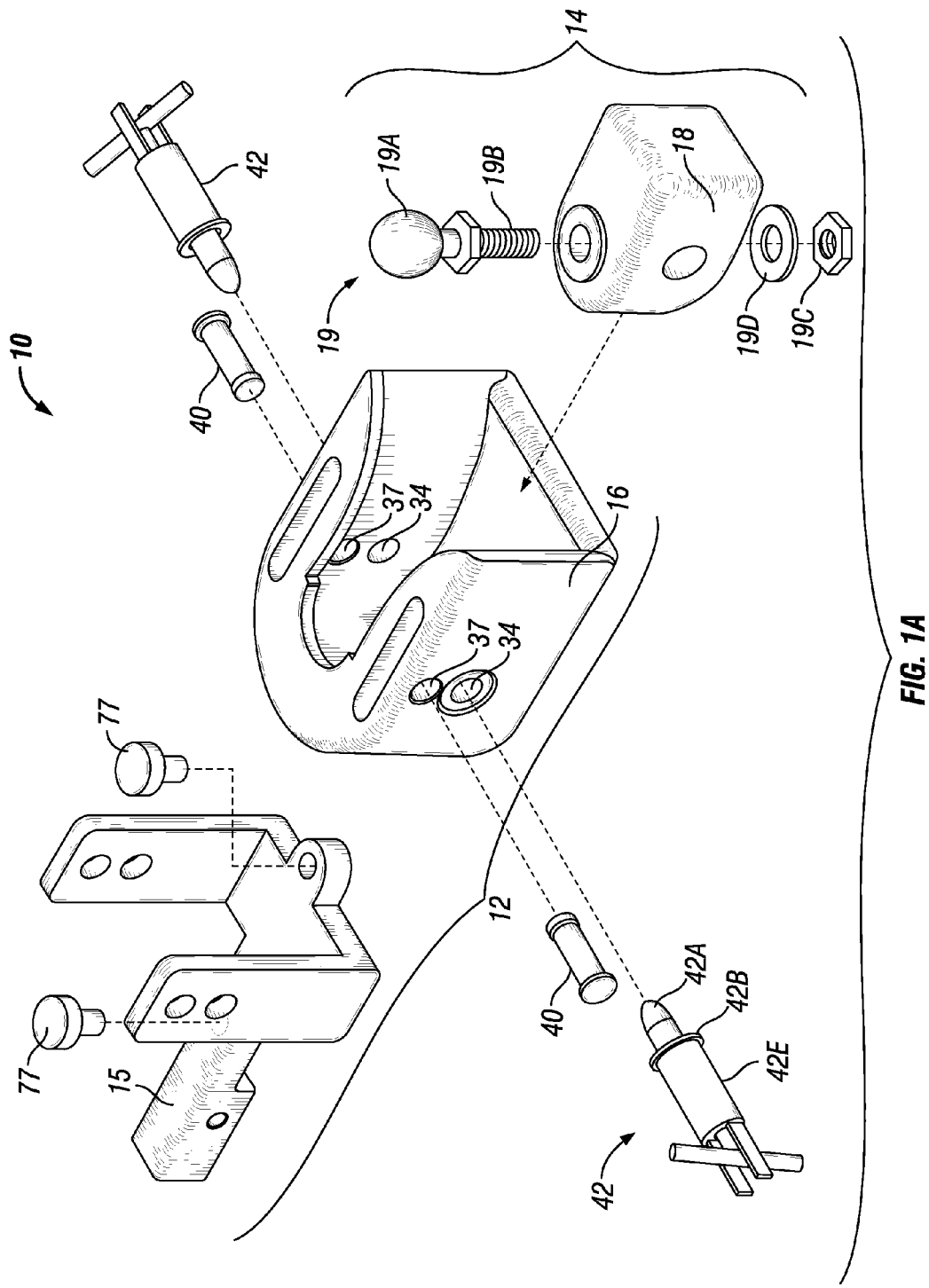

SYSTEM FOR VEHICLE AND TRAILER CONNECTION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE APPLICATION

The application relates generally to a system for interconnecting a trailer and a vehicle.

BACKGROUND

Trailer hitches are commonly used to tow trailers and the like behind vehicles. Trailer hitches that are generally used with automobiles and small trucks are usually attached to the rear frame of the towing vehicle with a universal pivot attachment, usually a tow ball, spaced behind the towing vehicle to pivotally receive thereon a mating attachment, such as a socket, on a tongue extending from the body of the trailer to be towed. One problem associated with these types of attachments includes aligning and connecting the receiver on the trailer to the tow ball on the trailer hitch of a vehicle. Alignment of a trailer and towing vehicle in three-dimensional space can be extremely difficult, and the connection is especially troublesome when a driver is alone and when the trailer is too heavy to move. A miscalculation on the part of the driver can result in damage to both the vehicle and trailer.

Thus, facilitating the connection between a vehicle and a trailer, as well as securely maintaining a connection, is desired. It is also desirable to increase the likelihood of achieving a coupling when there is a discrepancy in the respective alignments in three-dimensional space of the trailer and vehicle being coupled. In other words, it is desirable to facilitate mating of a trailer and vehicle, for instance, when one of the targets to be coupled is vertically or horizontally askew from the other.

SUMMARY

The present application is directed to a system for connecting a vehicle with a trailer. The system includes (a) a docking assembly for securing to the vehicle, the docking assembly being pivotable about the vehicle; and (b) a coupler assembly comprising a first part operationally configured to secure to a trailer, and a second part operationally configured for releasable securement to the docking assembly.

The present application is also directed to a system for connecting a vehicle with a trailer. The system comprises: (a) a docking assembly for securing to the vehicle, the docking assembly being pivotable about the vehicle; and (b) a coupler assembly for securing to the trailer, the coupler assembly being operationally configured to releasably secure to the docking assembly.

The present application is also directed to a hitching system comprising a docking assembly for securing to a vehicle and a coupler assembly including a ball assembly for securing to a trailer, wherein the coupler assembly is: (a) pivotable about the trailer, and (b) operationally configured to mate with the docking assembly.

The present application is also directed to a hitch assembly comprising a male member featuring a hitch, and a female member operationally configured to pivotably adjust to facilitate of entry of said male member therein.

The present application is also directed to method of hitching a vehicle with a trailer. The method comprises: (a) providing a hitching system including: (1) a docking assembly securable to a vehicle; and (2) a coupler assembly securable to a trailer, the coupler assembly including a first part operationally configured to secure to a trailer and a second part operationally configured to secure to the docking assembly; wherein the docking assembly is operationally configured to securably receive the second part of the coupler assembly therein; (b) securing the docking assembly to a target vehicle and the coupler assembly to a target trailer; and (c) directing the target vehicle toward the target trailer until the coupler assembly is secured to the docking assembly.

BRIEF DESCRIPTION OF THE FIGURES

FIG. 1A is a perspective view of an embodiment of the present system including a docking assembly 12 and a coupler assembly 14.

BRIEF DESCRIPTION

Figure 1B:
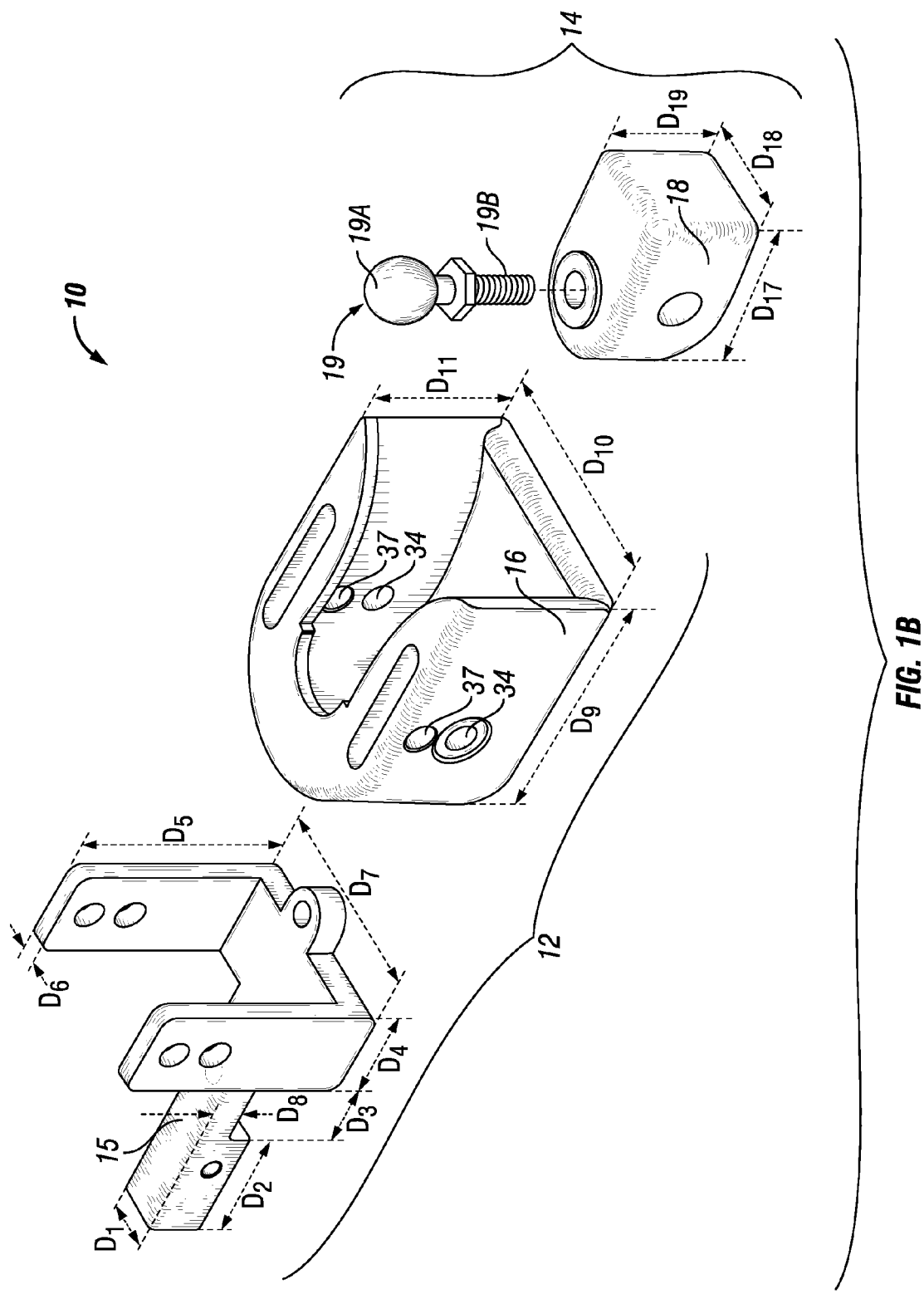
FIG. 1B is a perspective view of another embodiment of the docking assembly and coupler assembly.

The general purpose of the present invention, which will be described subsequently in greater detail, is to provide for enhanced locating, aligning and securing of a vehicle to a trailer for towing purposes. Heretofore, such a desirable enhanced functionality has not been achieved. Accordingly, the system and methods of this application measure up to the dignity of patentability and therefore represent patentable concepts.

Before describing the invention in detail, it should be understood that the present system and method are not limited to particular embodiments. It should also be understood that the terminology used herein is for the purpose of describing particular embodiments only, and is not intended to be limiting. As used in this specification and the appended claims, "vehicle," "vehicular" and like terms refer to any mode of conveyance capable of traveling across land, water or space. The verb "hitch" may refer to "joining," "connecting," "attaching," "coupling," "fastening," "linking" a vehicle and trailer for towing purposes. Regarding a trailer being towed, the term "pitch" refers to the degree of inclination or slope of the trailer during towing. With regard to the male member discussed below, the term "pitch" generally refers to the degree of pivoting in the direction of the trailer tongue. Herein, a "trailer" or "trailer tongue," shall minimally have its ordinary meaning, but may also refer to a trailer hitch coupler including a socket operationally configured to receive a ball hitch.

In one aspect, the application provides a hitching system operationally configured for use with a standard tow ball hitch or hitch ball assembly as the phrases are known to persons of ordinary skill in the art.

In another aspect, the application provides a hitching system operationally configured to mate a vehicle with a trailer. More particularly, the hitching system is operationally configured to align a vehicle with a trailer prior to securing the vehicle with the trailer.

In another aspect, the application provides a hitching system including a tow ball or ball hitch that is connected to a trailer rather than a vehicle. In such instance, the system is operationally configured to guide the ball hitch to a mating position with a vehicle.

In another aspect, the application provides a hitching system operationally configured to control the pitch at the point of attachment between a trailer and a vehicle.

In another aspect, the application provides a hitching system having a male type member releasably attachable to a trailer and a female type member releasably attachable to a vehicle. The male type member is pivotable about the trailer and the female type member is pivotable about the vehicle. During hitching of the vehicle with the trailer, the female member and the male member remain planarly aligned regardless of the pivot orientation of the male and female type members.

In another aspect, the application provides a hitching system defined by relocating the ball hitch from a vehicle to a trailer in a manner effective to mate the vehicle with the trailer.

In another aspect, the application provides a hitching system operationally configured to mate a vehicle with a trailer from a plurality of non-centered or non-linear paths to a centered or linear attachment between the vehicle and trailer.

In another aspect, the application provides a hitching system operationally configured to guide the ball hitch to a mating position with a vehicle from either a linear or non-linear path between the receiver portion of the vehicle and the coupler portion of the trailer.

In another aspect, the application provides a hitching system including a female type member having a tapered mouth for receiving a male type member.

In another aspect, the application provides a hitching system including a female type member for attaching to a vehicle and pivotal about the vehicle along a vertical plane.

In another aspect, the application provides a hitching system operationally configured to mate a vehicle with a trailer using a lone unassisted vehicle operator.

In another aspect, the application provides a hitching system that may be built to scale.

In another aspect, the application provides a hitching system operationally configured to mate a vehicle with a trailer by providing a vehicle not equipped with a ball hitch attached thereto.

In another aspect, the application provides a hitching system including a male type member operationally configured to receive a standard ball hitch or hitch ball assembly, the male type member having longitudinal lateral surfaces running lengthwise substantially perpendicular to the longitudinal axis of the ball hitch or ball hitch shaft, the male type member being releasably attachable to a trailer tongue via the ball hitch.

In another aspect, the application provides a system for connecting a vehicle with a trailer, comprising a docking assembly for securing to the vehicle and a coupler assembly for securing to the trailer. In particular, the coupler assembly comprises a first part operationally configured to secure to a trailer tongue, and a second part operationally configured to releasably secure to the docking assembly. More particularly, the docking assembly includes a first part operationally configured to secure to the vehicle, and a second part operationally configured to receive the second part of the coupler assembly therein.

In another aspect, the application provides a hitching system effective to preclude lateral tilt or roll of a trailer about the longitudinal axis of the towing vehicle and trailer.

In another aspect, the application provides a hitching system including a male member and a female member that may be secured to one another and both pivot together once secured.

Discussion of the System and Method

To better understand the novelty of the system and method of use thereof, reference is hereafter made to the accompanying drawings, in which like numerals represent like components throughout the varying views. The following description is merely exemplary in nature and is in no way intended to limit the invention, its application, or uses.

With reference to FIG. 1A, the system 10 includes at least (1) a docking assembly 12 securable to a vehicle; and (2) a coupler assembly 14 securable to a trailer—the system 10 being operationally configured to hitch a vehicle to a trailer for towing type purposes. In a simplified embodiment, the docking assembly 12 includes (1) a forked member 15 and (2) a female member 16. The coupler assembly 14 typically includes (1) a male member 18 and (2) a ball assembly 19. Although not necessarily limited to a particular configuration, a suitable ball assembly 19 includes commercially available ball hitch assemblies having at least a ball 19A, threaded shaft 19B, nut 19C and an optional lock washer 19D as desired.

Figure 2:
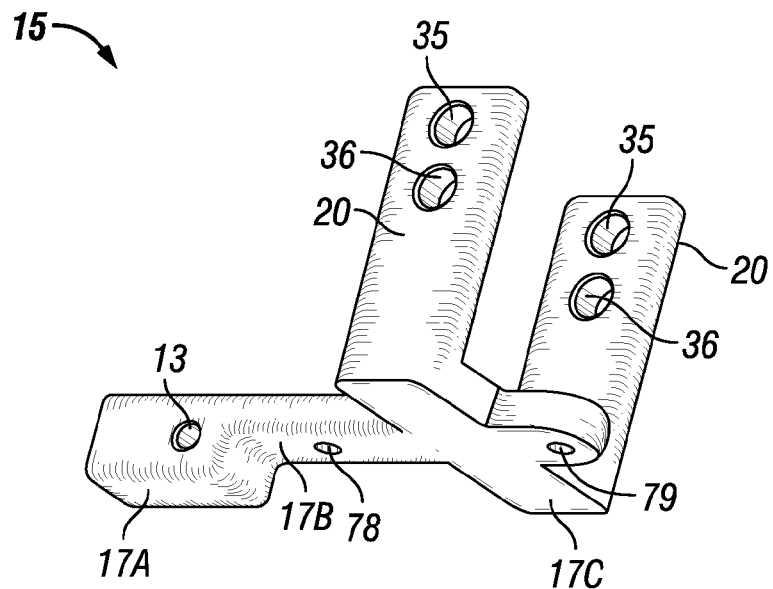
FIG. 2 is a perspective view of an embodiment of the forked member of the docking assembly.

With reference to FIG. 2, a suitable forked member 15 includes at least a first end 17A, a mid-section 17B, and a second end 17C. As known to persons of ordinary skill in the art of hitches, the first end 17A (or "male shank") is operationally configured to mate with a female type hitch receiver of a vehicle. As such, the first end 17A suitably includes at least a first hole 13 therethrough, the hole 13 being operationally configured to allow the forked member 15 to be releasably attached to a female type hitch receiver. In particular, as the first end 17A is inserted within a female type hitch receiver, the hole 13 is suitably aligned with corresponding holes on the hitch receiver, where after a pin or like device may be inserted there through to secure the forked member 15 to the hitch receiver. In a particularly advantageous embodiment, the forked member 15 may be releasably attached to a female type hitch receiver via a standard receiver pin such as a transverse pin. In another embodiment, the first end 17A may be secured to another section of a target vehicle as desired.

The mid-section 17B may comprise a substantially similar size and shape as the first end 17A. In another embodiment, the mid-section 17B of the forked member 15 may include a size and shape different from the first end 17A. The mid-section 17B may also comprise a through hole 78 as desired. As discussed below, the through hole 78 is operationally configured to receive a stop bumper or like material.

The second end 17C of the forked member 15 suitably includes one or more prongs 20 extending substantially perpendicular to the length of the mid-section 17B. Suitably, the prongs 20 are configured to mate with the female member 16 in a manner effective to secure the female member 16 to the forked member 15 during operation. In addition, the second end 17C may include a projected region having a through hole 79 as depicted in FIG. 2. As discussed below, the through hole 79 is operationally configured to receive a stop bumper or like material.

Figure 3:
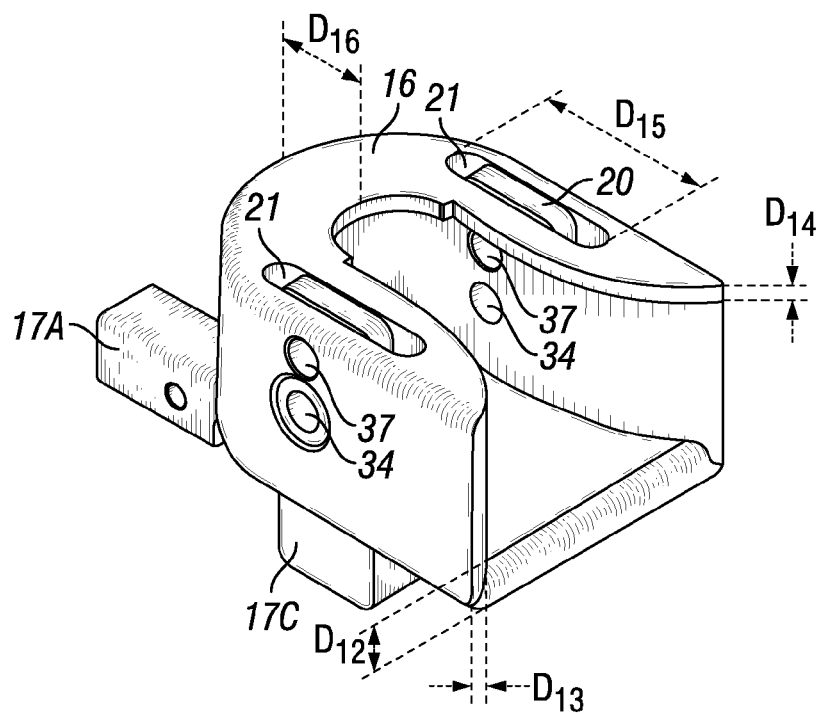
FIG. 3 is a perspective view of the docking assembly.

Turning to FIG. 3, the female member 16 component of the docking assembly 12 comprises apertures 21 operationally configured to receive the prongs 20 therein in a manner effective for the female member 16 to abut the forked member 15 during system IO operation. In one embodiment, spacers or like material may be located at various points between the prongs 20 and the female member 16 to provide stability and/or guard against wear. For example, in an embodiment including a metal forked member 15 and a metal female member 16, rubber stops may be added to the prongs 20 to safeguard against any metal to metal contact during system IO operation.

Referring again to FIG. 2, prong holes 35 are suitably centered along the prongs 20. During attachment of the docking assembly 12, the prong holes 35 are suitably aligned with holes 37 of the female member 16 whereby a pin or like device may be manually inserted there through to maintain a mated position between the forked member 15 and the female member 16. In another embodiment, the inner surface of the apertures 21 may comprise spring-loaded pins operationally configured to automatically mate with holes 35 to maintain a mated position between the forked member 15 and the female member 16.

Figure 4:
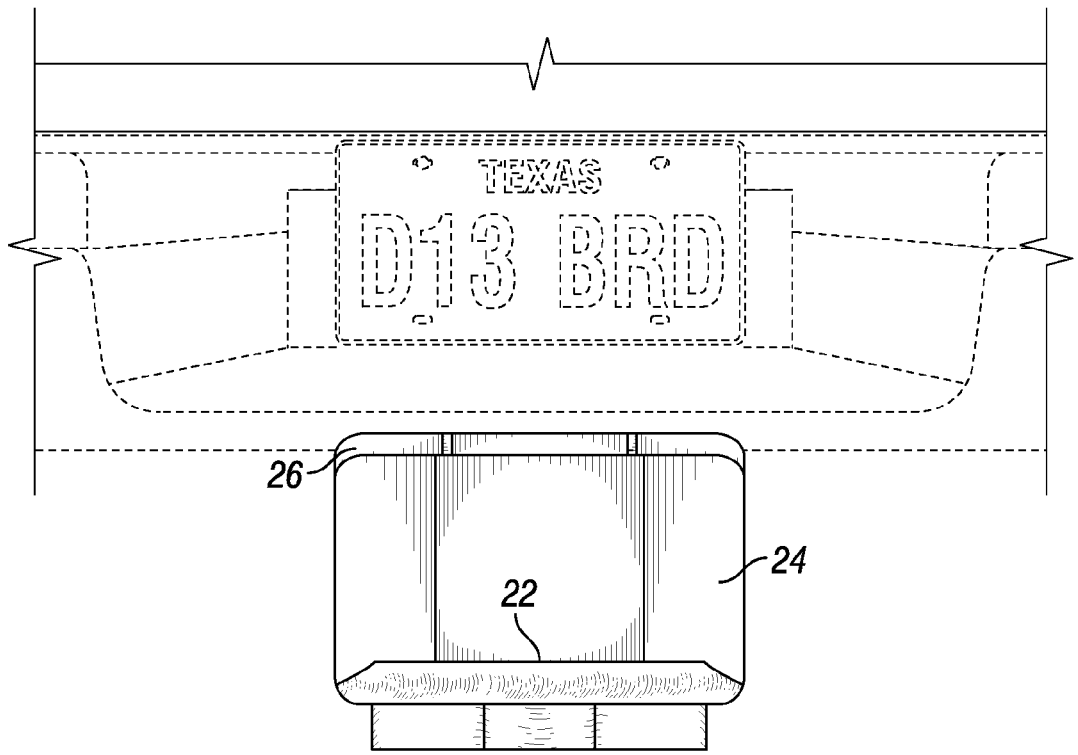
FIG. 4 is an environmental front view of the docking assembly.

As depicted in FIG. 4, a suitable female member 16 includes an open mouth configuration operationally configured to receive a corresponding male member 18 of the coupler assembly 14. More particularly, a suitable female member 16 is defined by three sections: (1) a substantially flat base 22; (2) a peripheral wall section 24; and a lip 26 extending inward from the wall section 24 forming a semi-closed surface opposite the base 22. Suitably, the female member 16 includes an open mouth defined by the edges of the base 22, wall section 24, and lip 26—the mouth being operationally configured to receive the male member 18 therein.

Figure 5:
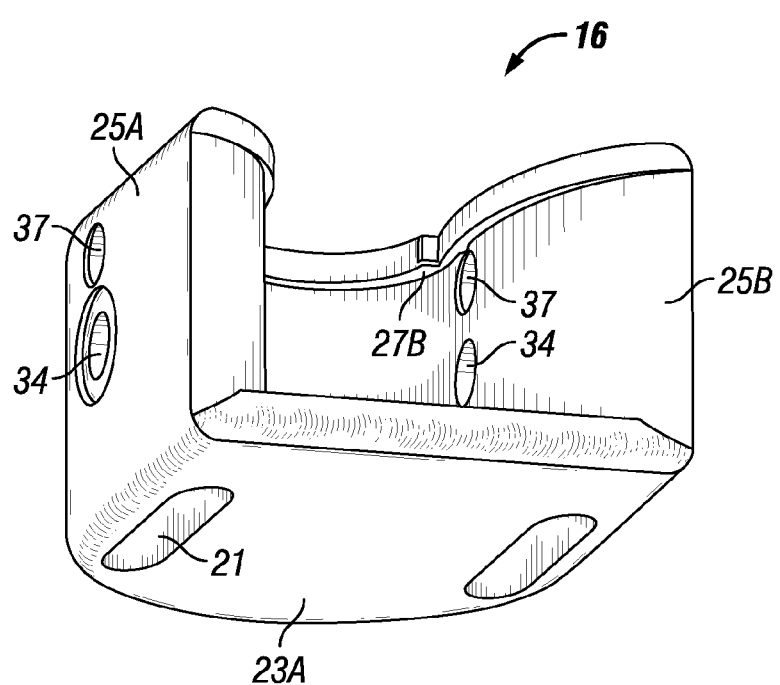
FIG. 5 is a perspective view of an embodiment of the female member of the docking assembly.
Figure 6:
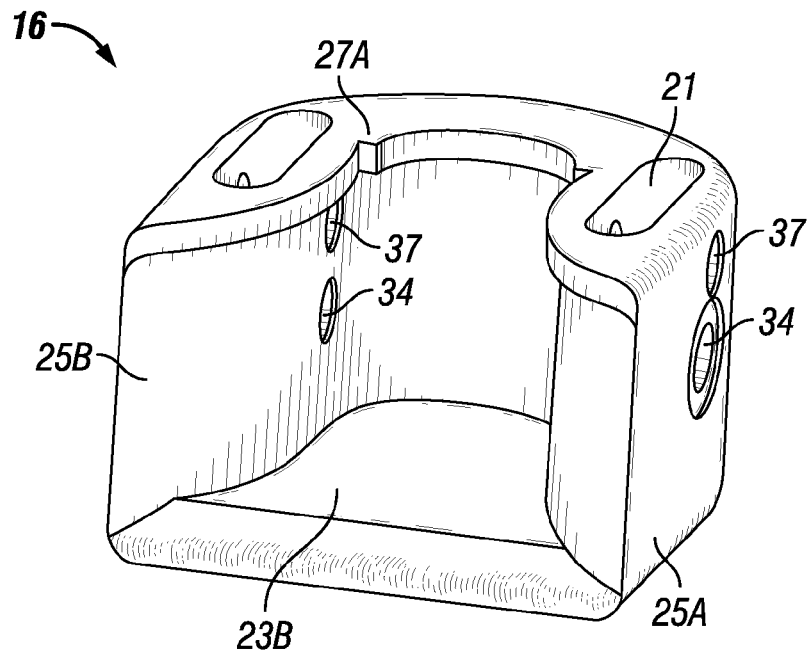
FIG. 6 is another perspective view of the female member.

As shown in FIGS. 5 and 6, the base 22 includes an outer surface 23A and an inner surface 23B. The wall section 24 is defined by an outer surface 25A and an inner surface 25B. The lip 26 suitably includes an outer surface 27A and an inner surface 27B. Although not necessarily limited to a particular configuration, the plane defining surface 25A is substantially perpendicular to the plane defining surfaces 23A and 27A.

In one embodiment, the edges of the base 22 and wall section 24 may be squared off. In a particularly advantageous embodiment, the edges of the base 22 and the wall section 24 are beveled, the wall section 24 projecting angularly inward narrowing deeper within the female member 16 wherein the wall section 24 is effective to guide the male member 18 to a proper mating position within the female member 16. Suitable beveled edges of the base 22 and wall section 24 may include angles up to about 45 degrees. Also shown in FIGS. 5 and 6, the female member 16 may feature a generally U-shape configuration, sometimes with outwardly flaring ends to facilitate entry of a coupler assembly 14 therein. In another embodiment, the female member 16 may feature a generally bell-shaped configuration with outwardly flaring ends to facilitate entry of a coupler assembly 14 therein.

As illustrated in the embodiments of FIGS. 4-6, the base 22 and wall section 24 suitably include beveled edges to facilitate entry and alignment of the male member 18 within the female member 16 from any path (linear or non-linear). Although the male member 18 and female member 16 are not limited to any one surface configuration, a suitable system 10 includes a female member 16 having an inner surface configuration substantially similar to the outer surface configuration of the male member 18 whereby the male member 18 may be inserted within the female member 16 to form a substantially snug fit abutting the surfaces 23B, 25B and 27B during system IO operation. In addition, once the male member 18 has reached full travel within the female member 16, the lip 26 is operationally configured to prevent the male member 18 from exiting the female member 16—except via the mouth as originally inserted.

Figure 7:
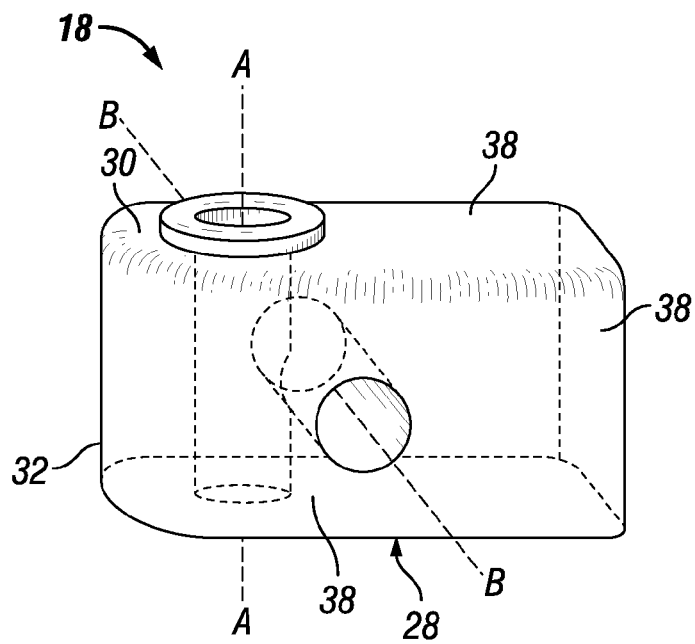
FIG. 7 is a perspective view of an embodiment of the male member of the coupler assembly.
Figure 8:
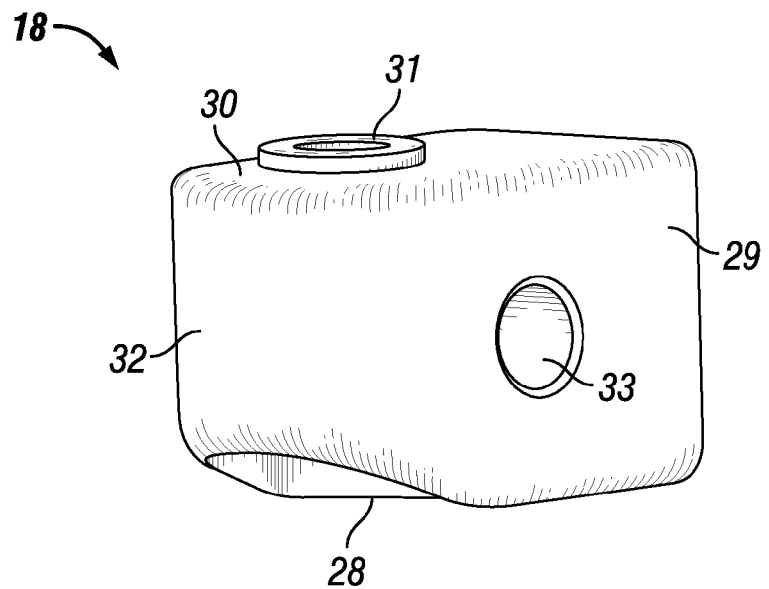
FIG. 8 is a perspective view of another embodiment of the male member.

Turning to FIGS. 7 and 8, the male member 18 suitably includes at least (1) a first surface 28 operationally configured to abut the inner surface 23B of the base 22, (2) a second surface 29 operationally configured to abut the inner surface 25B of the wall section 24, and (3) a third surface 30 operationally configured to abut the inner surface 27B of the lip 26. In addition, the second surface 29 suitably comprises a rounded surface 32 interposed between two opposing longitudinal lateral surfaces 38—the rounded surface 32 being operationally configured to facilitate the mating of male member 18 with the female member 16. Although not limited to a particular shape, the rounded surface 32 suitably comprises a half circle configuration.

In one embodiment, the interconnection between the first surface 28 and the second surface 29 may include a curvature toward the rounded surface 32. In a particularly advantageous embodiment as depicted in FIG. 8, the first surface 28 of the male member 18 suitably tapers toward the rounded surface 32 forming a mating face for abutment with the inner surface 23B of the base 22 wherein the tapered first surface 28 is effective to facilitate the mating action between the male member 18 and the female member 16 as discussed below. In addition, the tapered first surface 28 is operationally configured to prevent the male member 18 from pivoting back toward the trailer tongue as the male member 18 contacts the female member 16. Accordingly, the tapered first surface 28 operates as a form of pitch control preventing the male member 18 from jamming during mating with the female member 16.

As FIG. 8 further illustrates, the male member 18 may include a first aperture 31 therethrough, the aperture 31 being operationally configured to receive a ball assembly 19 during operation of the system 10. In a suitable embodiment, the aperture 31 is concentrically aligned with the rounded surface 32. Although the inner surface of the aperture 31 may be configured as desired, it is most suitably configured in a manner effective to secure the ball assembly 19 during system 10 operation. For example, in an embodiment using a commercially available automobile ball hitch, the inner surface of the aperture 31 provides a threaded connection for the threaded shaft 19B.

The male member 18 suitably includes a second aperture 33 therethrough. As shown in FIG. 7, the second aperture 33 extends through the longitudinal lateral surfaces 38. As shown in FIG. 8, the second aperture 33 may include a tapered perimeter to prevent jamming of one or more pins or pin assemblies 42 when mating the coupler assembly 14 with the docking assembly 12 by working in conjunction with the rounded nose profile of the pin or pin assemblies 42 during pin 42 insertion within aperture 33. The tapered perimeter of second aperture 33 and rounded nose profile of pins 42 also assist in properly aligning the male member 18 within the female member 16 as the pins 42 are inserted into aperture 33. The interaction of the second aperture 33 and pins 42 is discussed further below.

Figure 9:
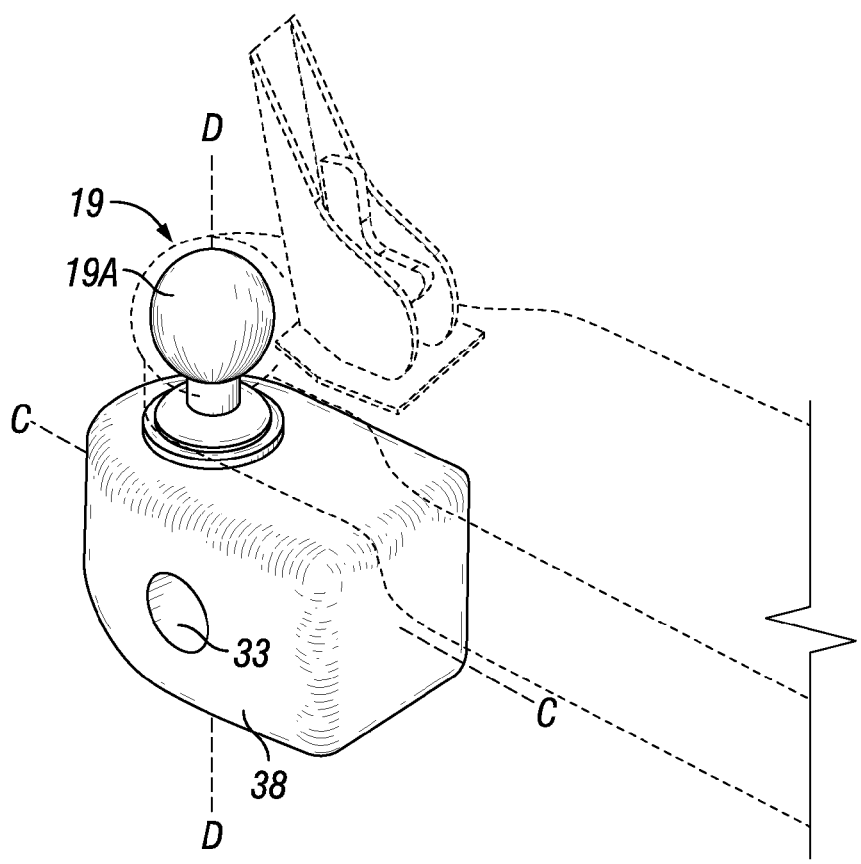
FIG. 9 is a perspective view of the coupler assembly including a phantom view of an exemplary trailer tongue attachable to the coupler assembly.

With regard to automobile or vehicular applications, the first aperture 31 (represented by the center axis line A-A in FIG. 7) is substantially perpendicular to the second aperture 33 (represented by the center axis line B-B in FIG. 7). In addition, the longitudinal axis C-C of the male member 18 is substantially perpendicular to the longitudinal axis of the ball assembly 19 D-D as depicted in FIG. 9.

For purposes of this application, the docking assembly 12 and coupler assembly 14 are not necessarily limited to any one particular material of construction. However, construction materials may depend on the intended use of the system 10. Suitably, the docking assembly 12 and coupler assembly 14 are constructed from one or more materials including, but not necessarily limited to materials resistant to chipping, cracking, and breaking as a result of ozone, weathering, heat, moisture, other outside mechanical and chemical influences, as well as violent physical impacts of varying forces at varying speeds. Suitable materials include, but are not necessarily limited to composite materials, plastics, rubbers, ferrous metals, non-ferrous metals, and combinations thereof.

Suitable composite materials include, but are not necessarily limited to to fiberglass and para-aramid synthetic fiber containing materials. In one embodiment, the docking assembly 12 and coupler assembly 14 are constructed from dense plastic. In another embodiment, the docking assembly 12 and coupler assembly 14 are constructed from stainless steel. In a particularly advantageous embodiment, the docking assembly 12 and coupler assembly 14 are constructed from high carbon steel, including for example, 4140 grade high carbon steel. Metal assemblies 12, 14 may be constructed from solid materials. In another embodiment, metal assemblies 12, 14 may be hollowed out thereby minimizing weight.

Figure 10:
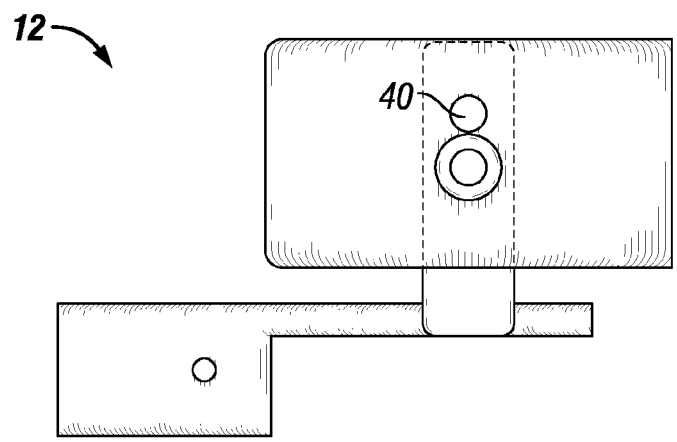
FIG. 10 is a side view of an embodiment of the docking assembly.
Figure 11:
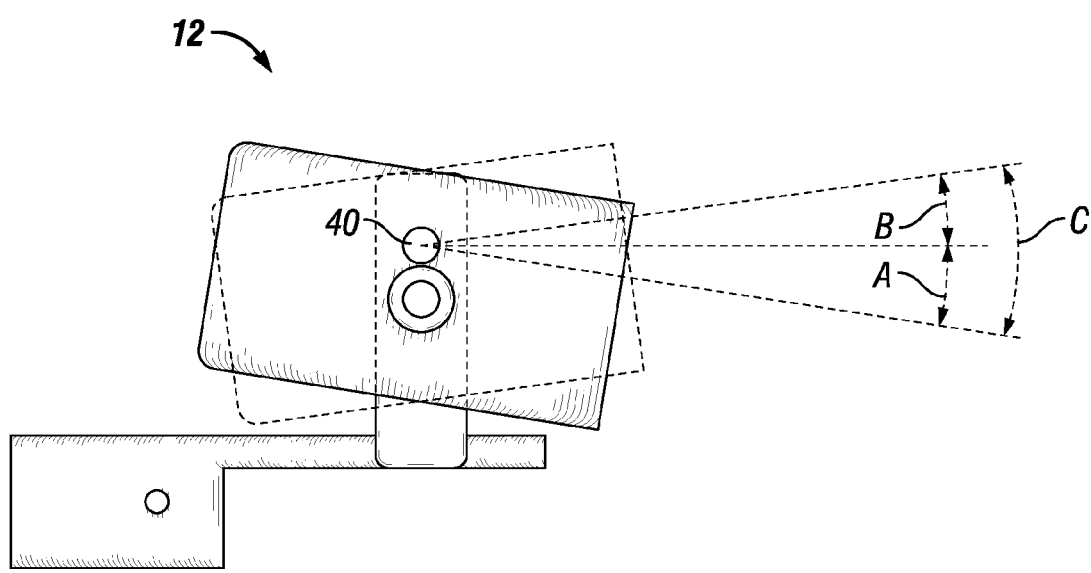
FIG. 11 is a side view of an embodiment of the docking assembly including a female member pivoted downward from horizontal.

With reference to FIG. 10, once the docking assembly 12 is fit together a pin 40 may be inserted through holes 37 and 35 to secure the female member 16 to the forked member 15. As stated above, prong holes 35 are centered along the prongs 20. Thus, in a particularly advantageous embodiment the pin 40 operates as a hinge pin and pivot point whereby, once assembled, the female member 16 suspends above the forked member 15 in a manner effective to allow the female member 16 to pivot about the hinge pin 40 upward and downward from horizontal as illustrated in FIG. 11. Ultimately, the pivot action of the female member 16 depends on the configuration of the docking assembly 12. In one suitable embodiment, the female member 16 may pivot upward and downward from horizontal until the outer surface 23A of the base 22 contacts the forked member 15. In an embodiment having stop bumpers 77 mated to holes 78 and 79, the female member 16 may pivot upward and downward from horizontal until the outer surface 23A contacts the stop bumpers 77.

Figure 12:
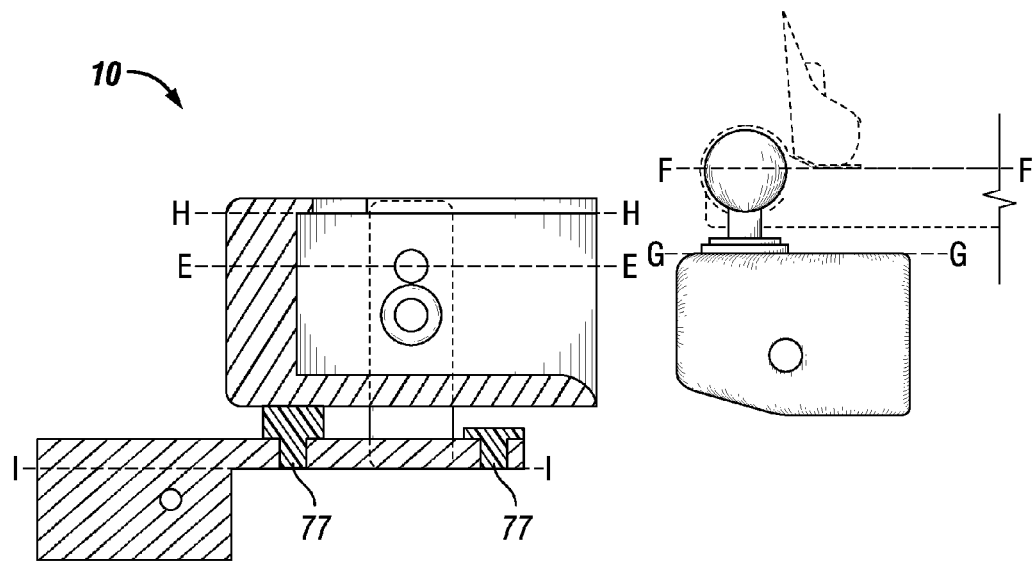
FIG. 12 is a side view of the system prior to mating the docking assembly with the coupler assembly.

Although the configuration of the docking assembly 12 dictates the range of motion of the female member 16, a suitable female member may pivot up to about 35 degrees. In a more particular embodiment, the female member 16 may pivot up to about 22.5 degrees, i.e., upward from horizontal about 11.25 degrees and downward from horizontal about 11.25 degrees. In a particularly advantageous embodiment for automobile use including stop bumpers 77 mated to through holes 78 and 79, the female member 16 is operationally configured to tilt only downward from horizontal up to about 15 degrees. In one particular embodiment, the stopper 77 at through hole 78 is operationally configured to prevent any upward pivoting of the female member 16 as shown in FIG. 12—thus facilitating the mating action between the female member 16 and male member 18.

Figure 15:
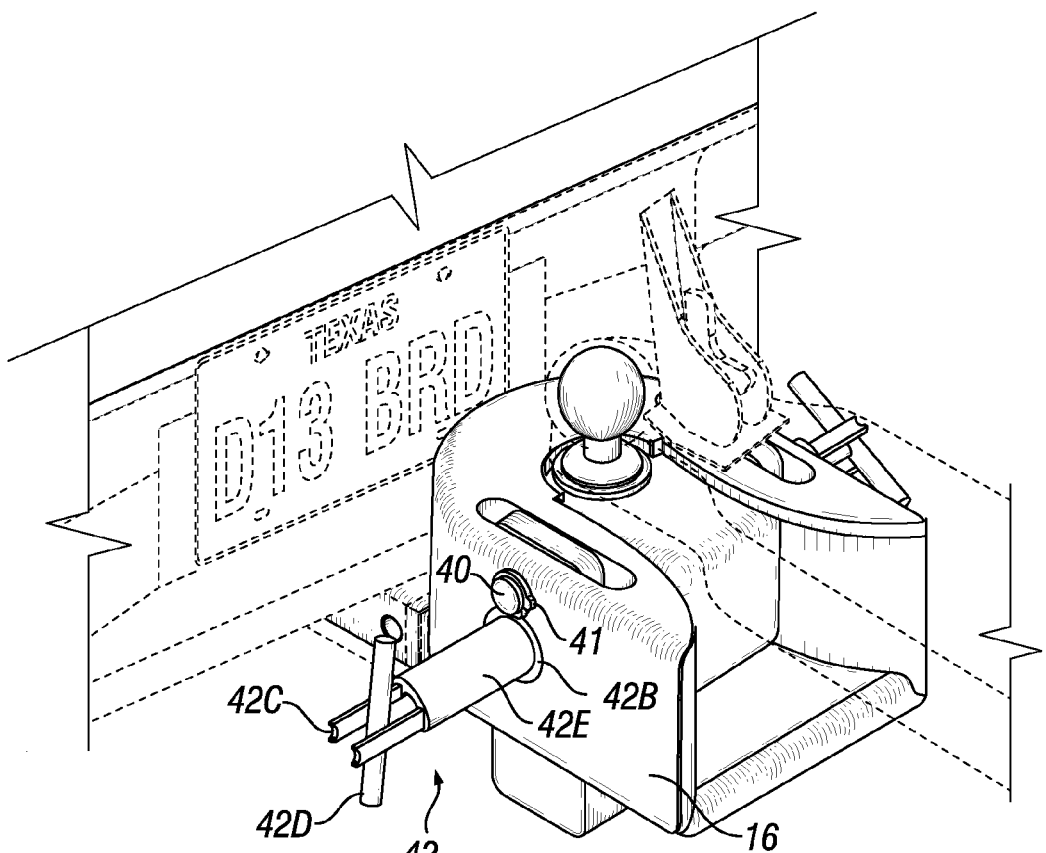
FIG. 15 is an environmental view of an embodiment of the system including a phantom view of a bumper region of a vehicle and trailer tongue.
Figure 16:
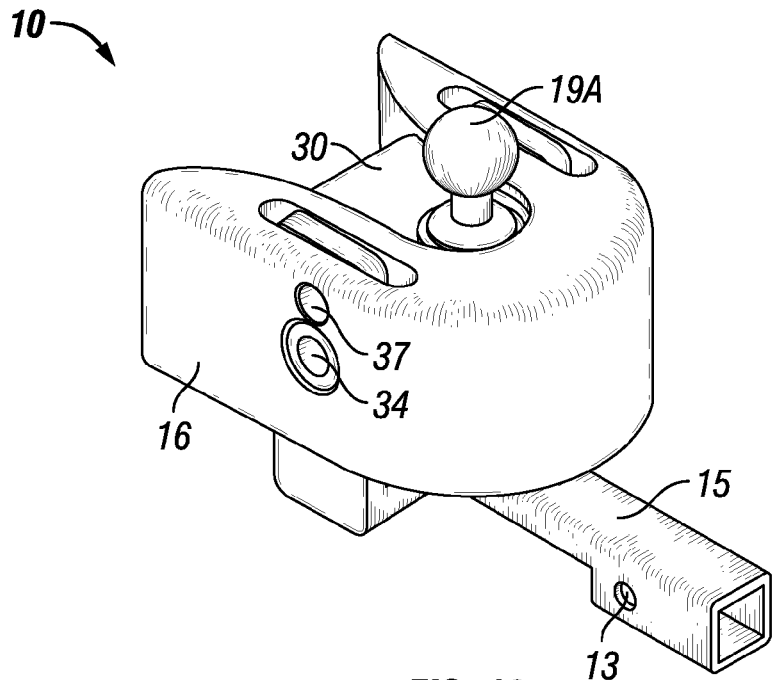
FIG. 16 is another perspective view of an embodiment of the system depicting the mated position between the docking assembly and the coupler assembly.
Figure 17:
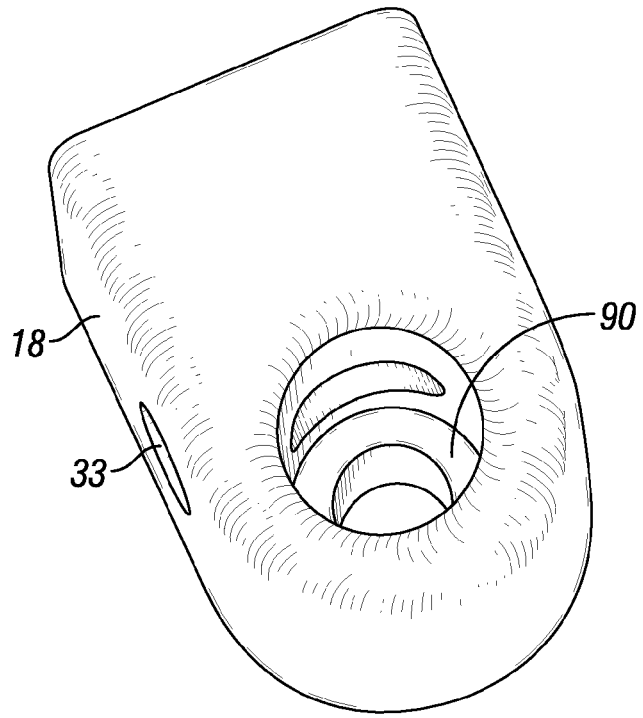
FIG. 17 is a bottom perspective view of an embodiment of the male member depicting a portion of the inner surface of aperture 31 including a substantially flat surface 90 to receive a nut 19C and lock washer 19D of a tow ball assembly.

Suitably, the hinge type pin 40 is cylindrical. In one embodiment, pin 40 may include a flat nail type head operationally configured to receive a snap ring 41, clamp or like device to secure the pin 40 to the female member 16 as illustrated in FIG. 15. For purposes of reinforcement, holes 37 of the female member 16 may include bossed regions to support the pins 40. In such embodiment, holes 35 of the forked member 15 are operationally configured to align with the bossed region of holes 37 during system IO operation.

Once the male member 18 is mated with the female member 16 the second pin 42 may then be employed to (1) prevent further pivoting of the female member 16, and (2) secure the male member 18 to the female member 16. Suitably, the location of the second aperture 33 of the male member 16 corresponds to (1) holes 34 located on opposing sides of the wall section 24 of the female member 16, and (2) holes 36 located on the prongs 20 of the forked member 15. Once the second aperture 33 is aligned with holes 34 and 36, a pin, pin assembly 42 or like device may be inserted there through to secure the male member 18 to the female member 16. In a particularly advantageous embodiment, the female member 16 is fitted with a spring loaded pin assembly 42 operationally configured to retract as the male member 18 is directed to a mating position within the female member 16. In operation, as the second aperture 33 aligns with holes 36, the retractable pins of the assembly 42 are operationally configured to spring toward one another through both holes 36 and the second aperture 33—thereby securing the male member 18 to the female member 16.

A suitable spring-loaded pin assembly 42 includes a rounded nose profile 42A for ease of retraction into the assembly casing as the male member 18 comes into contact with the profile 42A during system 10 assemblage. As stated above, the second aperture 33 may include a tapered perimeter that works in conjunction with the rounded nose profile 42A with the alignment and insertion of pins 42 within the second aperture 33. A suitable spring loaded pin assembly 42 may further include a collar 42B operationally configured to be releasably attached to the female member 16. In one embodiment, the collar 42B may be operationally configured to snap-fit to the perimeter of hole 34. In another embodiment, the collar 42B may be threadedly attached at hole 34. In still another embodiment, collar 42B may include through holes wherein the spring loaded pin assembly 42 may be screwed or bolted to the outer surface of the female member 16 at matching holes.

In one particular embodiment, the spring loaded pin assemblies 42 may include a grooved portion or a ridged portion on the surface of the casing 42E to assist a user in the process of disengaging the male member 18 from the female member 16 by providing a means for grabbing and pulling the profiles 42A out from at least the second aperture 33. As shown in FIG. 15, a ring or T-member type of handle 42D may be included as part of pin assembly 42 to assist a user in the process of disengaging the male member 18 from the female member 16. One suitable handle 42D may include a threaded connection for releasable attachment to profile 42A. Another suitable handle 42D may be permanently fixed to the profile 42A. As further illustrated in FIG. 15, the pin assembly 42 may also include cradled legs 42C operationally configured to maintain the handle 42D in a retracted position as desired.

For purposes of reinforcement, holes 34 of the female member 16 may include bossed regions along their perimeter to support the pin assemblies 42. In such embodiment, the holes 36 of the forked member 15 are operationally configured to align with the bossed regions of holes 34. Although not limited to a particular mode of operation, the rounded nose profiles 42A are suitably retractable a distance greater than the outer diameter of the pin casing 42E. Suitably, the pin assemblies 42 may be constructed from materials similar to the construction materials of the female and male members 16, 18. In another embodiment, the pin assemblies 42 may be constructed from one or more materials effective to maintain assembly of the system 10 during operation. For example, where the female and male members 16, 18 are constructed from aluminum, the corresponding pin assemblies 42 may be constructed from steel.

For hitching purposes, the docking assembly 12 may first be attached to a target vehicle followed by attaching the coupler assembly 14 to a target trailer, or vice versa. Concerning the manner of assembly and attachment, the docking assembly 12 and coupler assembly 14 is typically attached to the target vehicle and trailer prior to final assembly of the system 10.

For automobile hitching purposes, the first end 17A of the forked member 15 is suitably inserted into a vehicle hitch receiver and secured via a transverse pin or the like. Thereafter, the female member 16 is placed atop the forked member 15 by mating the prongs 20 with the apertures 21 in a manner effective for holes 37 of the female member to align with holes 35 of the forked member—as shown in FIG. 3. Pin profiles 42A may be inserted into holes 34 either before or after placing the female member 16 atop the forked member 15. Once mated and aligned, hinge pins 40 are inserted through holes 37 and 35—completing assemblage of the docking assembly 12. Depending on the configuration of the pin assembly 42, the pin assemblies 42 may need to be activated or otherwise placed in a set position for mating with the second aperture 33 of the male member 18. It should be further noted that a lone pin assembly 42 may be sufficient to secure the male member 18 within the female member 16, e.g., if one pin assembly 42 fails during operation.

Suitably, the coupler assembly 14 is pieced together by attaching the ball assembly 19 to the male member 18 as shown in FIG. 9. Once attached, the ball 19A is inserted and secured to the trailer tongue ball socket as understood by persons of ordinary skill in the art of hitches. Once inserted, the coupler assembly 14 suitably suspends from the trailer tongue where it may freely gimbal about the trailer tongue ball socket.

Following attachment of the assemblies 12 and 14 to a target vehicle and trailer, the height of the trailer may be adjusted to substantially align the height of the male member 18 with the height of the mouth of the female member 16—as depicted in the simplified embodiment of FIG. 12. As shown, the male member 18 need not be exactly elevationally aligned with the mouth of the female member 16. Rather, the surface configuration of the assemblies 12 and 14 allows for entry, alignment and mating of the assemblies 12, 14 from an initial non-linear alignment of the assemblies 12, 14 as discussed below.

In addition to the elevational alignment of the assemblies 12 and 14, the female member 16 and male member 18 are suitably substantially level prior to mating. As illustrated in FIG. 12, the surface line H-H of the lip 26 and the surface line G-G of the third surface 30 of the male member 18 are suitably positioned along substantially the same plane regardless of the altitude of each assembly 12, 14. In addition, the axis line F-F of the hitch ball 19A is on substantially the same plane as the surface line G-G of the third surface 30. Likewise, the axis line E-E of the hinge pin 40 and the longitudinal axis I-I of the forked member 15 are on substantially the same plane as the surface line H-H of the lip 26.

As stated above, the elevational alignment need not be exact. Rather the novel surface configurations of the female member 16 and the male member 18 allow for proper mating of the assemblies 12, 14 from non-correlating initial mating elevations. As depicted in the simplified embodiment of FIG. 12 where the surface line H-H of the lip 26 is at a greater elevation than the surface line G-G of the third surface 30 of the male member 18, one or more of the following features are effective for proper mating of the assemblies 12, 14: (1) the surface configuration of the female member 16, (2) the surface configuration of the male member 18, (3) the pivoting action of the female member 16 about hinge pins 40, and (4) the pivoting action of the coupler assembly 14 about the trailer tongue.

Figure 13:
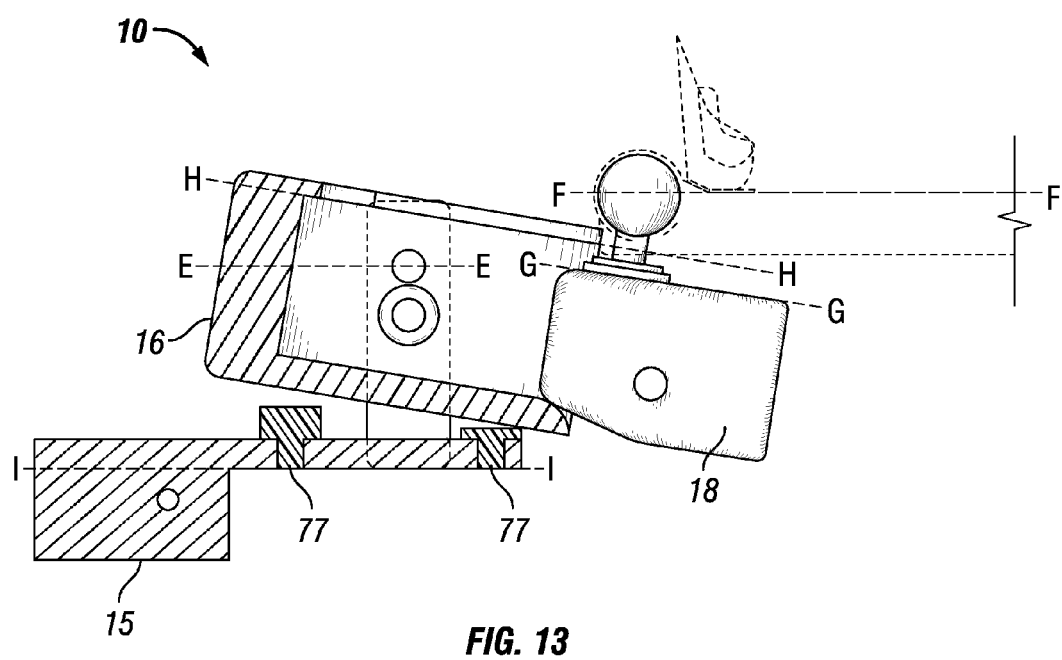
FIG. 13 is a side view of an exemplary system illustrating pivoting action of the docking assembly and the coupler assembly during initial contact.
Figure 14:
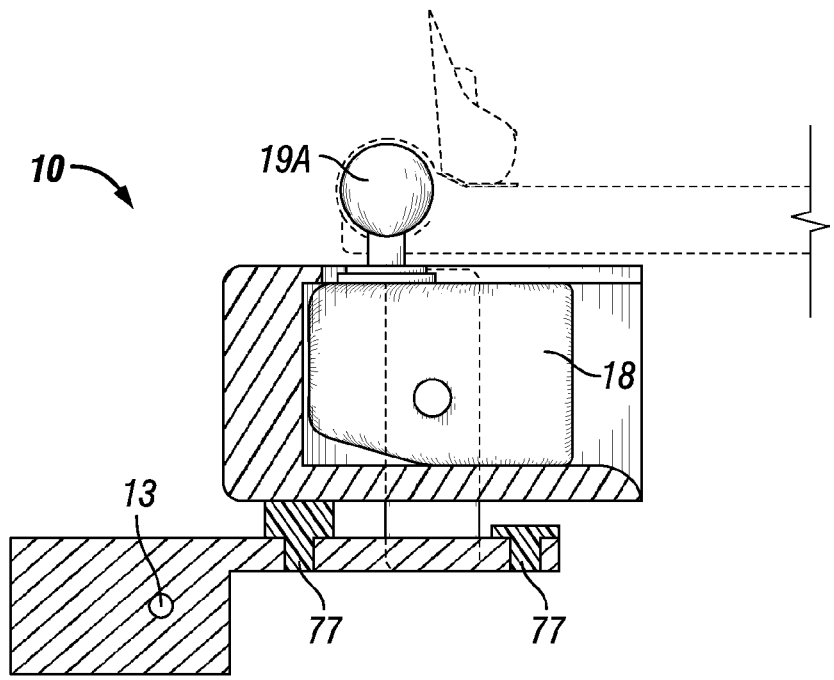
FIG. 14 is a side view of the system depicting a mated position between the docking assembly and the coupler assembly.

Turning to FIG. 13, as the female member 16 of FIG. 12 comes into contact with the male member 18, the female member 16 begins to pivot downward (see the surface line H-H). In particular, the beveled edge of the base 33 begins to contact the tapered section of the first surface 28 of the male member 18, which forces the female member 16 to pivot downward from horizontal a desired distance until the outer surface 23A of the base 22 contacts the stop bumper 77 of hole 79. As the male member 18 is directed within the female member 16, the female member 16 simultaneously begins to pivot upward to a substantial horizontal alignment as the third surface 30 of the male member 18 reaches full abutment with the inner surface 27B of the lip 26 realigning surface line H-H of the lip 26 on substantially the same plane as the axis line E-E. During initial contact between the female and male members 16, 18, the male member 18 may also pivot upward to begin effective mating between the female and male members 16, 18 (see surface line G-G in FIG. 13). Once the male member 18 reaches full travel within the female member 16, the female member 16 has optimally returned back to its original level pre-mated position—as shown in FIG. 14.

Although not necessary for proper mating of the assemblies 12 and 14, the target trailer may be stabilized prior to hitching using wheel chocks or the like to prevent trailer movement. Once the trailer is stabilized as desired and the assemblies 12, 14 are aligned in space, the vehicle operator may direct the vehicle toward the trailer, i.e., typically in a reverse direction, for hitching purposes. Following initial contact between the assemblies 12, 14, the trailer may lift as the male member 18 is directed within the female member 16 until the male member 18 reaches full travel. Once the system 10 is assembled as desired, safety chains may be attached and the trailer tongue support may be retracted for road safety clearance as desired.

During uncoupling of the system 10, e.g., when no longer needing to tow the trailer, the vehicle operator may use trailer wheel chocks or the like to prevent trailer movement as the vehicle is separated from the trailer. The profiles 42A may be manually retracted out from the second aperture 33 to unsecure the male member 18 from the female member 16. After removing any safety chains and/or adjusting the trailer tongue support, the vehicle may be directed forward whereby the docking assembly 12 is separated from the coupler assembly 14. The docking assembly 12 and coupler assembly 14 can be removed from the vehicle and trailer and there after stored as desired.

Although the system 10 may be designed for operation in connection with common passenger automobiles, it is contemplated herein that the forked member 15 may be configured to fit larger vehicles such as fifth-wheels and the like. In addition, although common passenger vehicles typically include square type hitch receivers, the present forked member 15 may be configured to mate with any particular size and/or shape of hitch receiver as desired. The system 10 may also be fitted with a breakaway kit for trailers having electric brakes. Rear view cameras may also be used to assist a vehicle operator during hitching of the system 10 as desired.

The invention will be better understood with reference to the following non-limiting examples, which are illustrative only and not intended to limit the present invention to a particular embodiment.

Example 1

In a first non-limiting example, a system 10 constructed from 6061 aluminum alloy is provided, the system 10 is used in conjunction with a commercially available pick-up truck having a [2.0 inches×2.0 inches] hitch receiver. With reference to FIGS. 1B and 3, the system 10 is described as follows:

I. Docking Assembly 12

| Forked Member 15 | |
| --- | --- |
| D1: | about 2.0 inches (about 5.08 cm) |
| D2: | about 4.0 inches (about 10.2 cm) |
| D3: | about 6.0 inches (about 15.2 cm) |
| D4: | about 3.0 inches (about 7.62 cm) |
| D5: | about 7.5 inches (about 19.1 cm) |
| D6: | about 1.0 inches (about 2.54 cm) |
| D7: | about 6.0 inches (about 15.2 cm) |
| D8: | from about 1.0 inches (about 2.54 cm) up to about 2.0 inches (about 5.08 cm) |
| Diameter of Holes 35: | about 1.0 inches (about 2.54 cm) |
| Diameter of Holes 36: | about 1.0 inches (about 2.54 cm) |
| Diameter of Hole 78: | about 0.375 inches (about 0.95 cm) |
| Diameter of Hole 79: | about 0.375 inches (about 0.95 cm) |
| Female Member 16 | |
| D9: | about 10.0 inches (about 25.4 cm) |
| D10: | about 8.5 inches (about 21.6 cm) |
| D11: | about 5.5 inches (about 14.0 cm) |
| D12: | about 1.0 inches (about 2.54 cm) |
| D13: [Near Bottom Edge of Wall Section] | about 0.31 inches (about 0.79 cm) |
| [Along Wall Section] | about 0.75 inches (about 1.91 cm) |
| D14: | about 0.5 inches (about 1.27 cm) |
| D15: | about 5.0 inches (about 12.7 cm) |
| D16: | about 3.25 inches (about 8.3 cm) |
| Inner Diameter of Holes 37: | about 1.01 inches (about 2.57 cm) |
| Inner Diameter of Holes 34: | about 1.01 inches (about 2.57 cm) |
| Outer Diameter of Pin 40: | about 1.0 inches (about 2.54 cm) |
| Outer Diameter of Pin 42: | about 1.0 inches (about 2.54 cm) |
| Length of Beveled edge of base 33: | about 0.25 inches (about 0.64 cm) at 90 degrees |

II. Coupler Assembly 14

| Male Member 18 | |
| --- | --- |
| D17: | about 6.0 inches (about 15.2 cm) |
| D18: | about 4.0 inches (about 10.2 cm) |
| D19: | about 4.0 inches (about 10.2 cm) |
| Diameter of Aperture 31 at third surface 30: | about 1.19 inches (about 3.02 cm) with a threaded depth of about 1.75 inches (about 4.45 cm) |
| Diameter of Aperture 31 at first surface 28: | about 1.75 inches (about 4.45 cm) up to a depth of about 2.25 inches (about 5.72 cm) |
| Diameter of Aperture 33: | about 0.995 inches (about 2.53 cm) |
| Aperture 33 is initially drilled to about 1.0 inches (about 2.54 cm), and the inner surface is thereafter micro-polished about .005 inches using an abrasive sheet of 600 grit. | |
| Rounded Surface 32: | Half Circle Configuration |
| Ball Assembly 19 | |
| Ball 19A Diameter: | about 2¼ inches (about 57.15 mm) |
| Shaft 19B Length: | about 1⅜ inches (about 35.00 mm) |
| Shaft 19B Diameter: | about 1.00 inches (about 25.00 mm) |

Example 2

In a second non-limiting example, a system 10 constructed from composite materials is provided, the system 10 is provided according to the parameters of Example 1.

Example 3

In a third non-limiting example, a system 10 constructed from steel is provided. Dimensions 3—16 are approximately 25% less than as described in Example 1.

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

I claim:

1. A system for connecting a vehicle with a trailer, comprising:
    a docking assembly for securing to the vehicle, the docking assembly being pivotable; and
    a coupler assembly comprising a ball assembly operationally configured to secure to a trailer, and a male member operationally configured for releasable securement to the docking assembly;
    wherein the docking assembly includes a female member having an inner surface defined by a base, a wall section, and a lip extending inward from the wall section opposite the base, the inner surface forming a mouth operationally configured to receive the male member therein; and
    wherein the male member includes a first surface operationally configured to abut the base, a second surface operationally configured to abut the wall section, and a third surface operationally configured to receive the ball assembly for attachment thereto.

2. The system of claim 1 wherein the coupler assembly is pivotable about the trailer.

3. The system of claim 1 wherein the docking assembly includes a forked member having a first end operationally configured to secure to a vehicle, and a second end operationally configured to releasably attach to the female member.

4. The system of claim 1 wherein the third surface of the male member is operationally configured to abut the lip.

5. A system for connecting a vehicle with a trailer, comprising:
   a docking assembly for securing to the vehicle, the docking assembly being pivotable; and
   a coupler assembly for securing to the trailer, the coupler assembly comprising a ball assembly operationally configured to be releasably secured to the trailer and a male member operationally configured to be releasably secured to the docking assembly, the ball assembly and male member each being defined by a longitudinal axis;
   wherein the docking assembly includes a female member and a forked member, the forked member having a first end operationally configured to be releasably secured to the vehicle and a second end operationally configured to receive the female member in pivotable attachment thereto;
   wherein the male member includes a first planar surface and a second planar surface opposed thereto, the ball assembly extending from the first planar surface:
   wherein the female member includes at least a first inner surface and a second inner surface, the female member being operationally configured to receive the male member therein whereby the first planar surface of the male member abuts the first inner surface of the female member and the second planar surface of the male member abuts the second inner surface of the female member; and
   wherein the surface area of the second inner surface of the female member is greater than the surface area of the first inner surface of the female member.

6. The system of claim 5 wherein the surface configuration of the male member is effective to facilitate alignment and mating of the coupler assembly within the docking assembly from non-correlating elevations.

7. The system of claim 5 wherein the coupler assembly is automatically secured to the docking assembly as the vehicle is connected with a trailer.

8. The system of claim 5 wherein the coupler assembly is pivotable about the trailer.

9. The system of claim 5 wherein the planes defining the first and second surfaces of the male member are substantially perpendicular to the longitudinal axis of the ball assembly.

10. The system of claim 5 wherein the male member includes an aperture operationally configured to receive the ball assembly therein.

11. The system of claim 5 wherein the male member further includes a third surface disposed between the first and second planar surfaces, the third surface comprising a rounded surface interposed between two opposing longitudinal lateral surfaces.

12. The system of claim 11 further including an interconnection between the second planar surface and the third surface, the interconnection including a curvature toward the rounded surface of the second planar surface.

13. The system of claim 5 wherein the inner surface configuration of the female member is effective for mating and aligning the coupler assembly with the docking assembly from non-linear positions.

14. A hitching system, comprising:
   a docking assembly for securing to a vehicle; and
   a coupler assembly including a male member defined by an outer surface configuration and a ball assembly for securing to a trailer, the coupler assembly being (a) pivotable about the trailer, and (b) operationally configured to mate with the docking assembly,
   wherein the docking assembly includes a forked member and a female member, the forked member having a first end releasably attachable to a vehicle and a second end operationally configured to receive the female member in pivotable attachment thereto, the female member being pivotable up to about 35 degrees about the forked member.

15. The system of claim 14 wherein the male member includes a first aperture having a central axis and a second aperture having a central axis, the first aperture being operationally configured to receive the ball assembly therein, wherein the central axis of the second aperture is substantially perpendicular to the central axis of the first aperture.

16. The system of claim 15 wherein the male member has a longitudinal axis substantially perpendicular to the central axis of the first aperture.

17. The system of claim 14 wherein the outer surface of the male member has a tapered first surface operationally configured to prevent the male member from pivoting back toward the trailer as the male member contacts the docking assembly when mating the coupler assembly with the docking assembly.

18. The system of claim 14 wherein the female member includes an inner surface configuration substantially similar to the outer surface configuration of the male member.

19. The system of claim 18 wherein the female member and the male member remain planarly aligned while hitching the vehicle with the trailer.

20. The system of claim 14 wherein the female member is pivotable about 22.5 degrees.

21. A hitch assembly comprising a male member featuring a hitch, and a female member operationally configured to pivotably adjust to facilitate entry of said male member therein; the female member having an inner surface defined by a base section, a wall section, and a lip extending inward from the wall section opposite the base section, wherein the surface area of the base section is greater than the surface area of the lip.

22. The hitch assembly of claim 21, wherein said female member is securely and hingedly mated to a forked member upon which forked member the female member may pivotally swing in an upward or downward direction.

23. The hitch assembly of claim 21, wherein said male member may also move in a pivotal fashion.

24. The hitch assembly of claim 21, wherein said hitch assembly comprises a ball hitch that is connected to a trailer rather than a vehicle.

25. A method of hitching a vehicle with a trailer, comprising:
   providing a hitching system including (1) a docking assembly securable to a vehicle; and (2) a coupler assembly securable to a trailer, the coupler assembly including a ball assembly operationally configured to secure to a trailer and a male member operationally configured to secure to the docking assembly; the docking assembly including a female member having an inner surface configuration defined by a base section, a wall section, and a lip extending inward from the wall section forming a semi-closed surface opposite the base section wherein the female member is operationally configured to securably receive the male member therein, the male member including an outer surface configuration operationally configured to abut the surfaces of the base section, wall section and lip;

securing the docking assembly to a target vehicle and the coupler assembly to a target trailer; and directing the target vehicle toward the target trailer until the coupler assembly is secured to the docking assembly.

26. The method of claim 25 wherein the female member is pivotable about the target vehicle and the coupler assembly is pivotable about the target trailer.

27. The method of claim 26 wherein the female member and the male member remain planarly aligned while hitching the target vehicle with the target trailer.

28. The method of claim 25 wherein the ball assembly and male member are each defined by a longitudinal axis, the longitudinal axis of the male member being substantially perpendicular to the longitudinal axis of the ball assembly.

29. The method of claim 25 wherein the male member has a tapered first outer surface, a planar second outer surface, and a planar third outer surface opposed to said second outer surface, wherein the tapered first outer surface is operationally configured to prevent the male member from pivoting back toward the trailer as the male member contacts the female member when mating.

* * * * *